Patented Oct. 10, 1950

2,525,028

UNITED STATES PATENT OFFICE 2,525,028

PREPARATION OF SILICATE PHOSPHORS, INCLUDING FIRING IN THE PRESENCE OF STEAM

Herman C. Froelich, Cleveland Heights, Ohio, assignor to General Electric Company, a corporation of New York No Drawing. Application December 6, 1946, Serial No. 714,672

8 Claims. (Cl. 252—301.6)

My invention relates generally to phosphors, that is, fluorescent or phosphorescent materials which are rendered luminescent by impinging radiations such as ultra-violet rays, cathode rays, X-rays, etc. More particularly, the invention relates to the preparation of thermally synthesized inorganic phosphor compositions which have, as matrix, a silicate compound. An object of the invention is to provide a process of preparing such phosphors which results in increased efficiency of the phosphor or a substantial reduction in the time of firing required to form the phosphor, or both.

This application is a continuation-in-part of my applications Serial No. 498,405, filed August 12, 1943, now abandoned, No. 488,956, filed May 29, 1943, now abandoned, and No. 499,642, filed August 23, 1943, now Patent No. 2,415,129.

The synthesis of phosphors is usually carried out by firing the ingredients at elevated temperatures of the order of 700–1300° C. in air. In special instances, a reducing atmosphere has been employed to prevent oxidation of an activator to a higher valent form. However, according to the present invention, I have discovered that steam is a most effective catalyst for reactions involving silicate phosphors, the formation of the phosphors being accelerated and their brightness in many cases being improved several fold if they are fired in steam instead of air.

The action of the steam seems to be two-fold, that is, kinetic and chemical. When steam functions kinetically, it catalyzes the formation of the phosphors, and produces brighter phosphors. It is not known just what atomic mechanism may be responsible for these effects. As far as I have been able to determine, no changes in the crystal structure of the phosphor and no changes in the valence of the activators are involved.

Thus, calcium silicate phosphor containing a small percentage of manganese oxide (MnO) has the same crystal structure whether fired in steam or in air, but it forms a much brighter phosphor when fired in steam. Manganese-activated magnesium silicate phosphor is another example where the crystal structure of air and steam fired silicates seems to be identical, yet the brightness of steam fired silicate may be several fold that of air fired phosphor. Another example, involving an activator other than manganese, is cerium-activated aluminum silicate phosphor. Batches of this phosphor have turned out twice as bright in mixtures of steam with nitrogen or hydrogen, compared with dry nitrogen or hydrogen alone. Still other examples are titanium-activated silicates, particularly those of metals of group II of the periodic system of atomic weight below 200, such as calcium, wherein the phosphor has been improved a third in output by firing in steam.

Since chemical effects could not be associated with the exposure to steam of such compounds as $CaSiO_3$ or $MgSiO_3$, the function of the steam is apparently catalytic. This would indicate that the arrangement in space of all the atoms and ions in a phosphor crystal is brought about more speedily and more perfectly when the phosphor is fired in steam instead of in air.

In other cases steam has a chemical function as well, particularly when it is used in conjunction with hydrogen. In the preparation of low-temperature yellow-fluorescing manganese-activated zinc silicate, for example, its presence serves to keep the reduction of ZnO to a minimum, according to the reversible equation: $ZnO + H_2 \rightleftharpoons Zn + H_2O$. Considering the law of mass action, it will be appreciated that large amounts of $H_2O$, and only large amounts, will help prevent a large loss of zinc as metal vapor. This combination of chemical and kinetic function of the steam has made it possible to produce yellow zinc silicate phosphor of greater brightness, greater $ZnO:SiO_2$ mol ratio, higher MnO content, higher percentage of long-wave emission, and greater particle fineness, than by any other known method.

One of the chief difficulties in the preparation of manganese-activated phosphors is the incorporation of the manganese as divalent Mn ion into the phosphor matrix. When manganese compounds such as the lower oxide MnO are heated in air, they oxidize to form higher valent compounds such as $Mn_2O_3$. The latter are not soluble in most phosphor matrices. The preparation of manganese-activated silicates, for example, involves first an oxidation of divalent MnO to trivalent $Mn_2O_3$, then a dissociation (or reduction) of the latter to give MnO and oxygen, and finally the solution of MnO throughout the matrix lattice. In my Patent 2,408,621 and the divisional application thereof, Serial No. 666,776, filed May 2, 1946, I have described means of effecting this reduction and re-solution of MnO, such as treatment with hydrogen or heating of the finished phosphor in vacuo. Steam seems to be also a good catalyst for the dissociation of $Mn_2O_3$, and MnO may be formed even though no actual chemical reduction is involved as when hydrogen is used.

I will now set forth further particulars regarding preferred processes of preparing the various phosphors referred to above.

Silicates of the alkaline earth metals, preferably calcium, activated by manganese, or by both manganese and lead, may be prepared as set forth in my application Serial No. 488,956 hereinbefore referred to. Calcium silicate activated with manganese gives a series of phosphors that are excited by cathode rays to emit greenish, yellow, or orange light, depending on the amount of manganese present, and to some extent on the method of preparation. When activated with lead and excited by cathode rays, as disclosed in application Serial No. 396,183 of G. R. Fonda, filed May 31, 1941, now abandoned, calcium silicate generally emits long-wave ultraviolet with some small amount of blue light, while under excitation by 2537 Å radiation it gives only long-wave ultraviolet peaking around 3400 Å. When activated by both manganese and lead, calcium silicate responds to excitation by 2537 Å radiation to emit a reddish or pink light as well as ultraviolet peaking around 3300 Å. The manganese may be present in amounts of about 1 to 5 per cent MnO by weight, and the lead in amounts of about .2 to 3 per cent PbO by weight, while the mol ratio of $CaO:SiO_2$, though not very critical, is preferably fixed at about 1:1.1 to 1:1.5.

A convenient way of making the phosphor is by direct synthesis of ingredients comprising or yielding calcium oxide, silica, lead oxide and manganese. Thus a suitable batch may consist of:

| | Grams |
|---|---|
| Calcium carbonate ($CaCO_3$) 1 mol or | 50 |
| Silicic acid ($SiO_2.xH_2$) to give silica ($SiO_2$) 1.1 mol or | 38.8 |
| Lead oxide (PbO) | 1.6 |
| Manganese carbonate ($MnCO_3$) having a 60 per cent content of manganese oxide | 2.4 |

For increased red light the manganese carbonate may be increased to 3 g., and for still deeper red to 3.6 grams. The ingredients are thoroughly mixed together dry in a fine state of division, and then heated in a refractory crucible (as of porcelain, silica or Alundum) in a refractory electric muffle furnace at a temperature of about 1000 to 1250° C. in an atmosphere of steam continually supplied to one end of the furnace. The optimum time of heating depends mainly on the size of the batch, some two to three hours being satisfactory for a batch of about 90 to 100 grams according to the formula given above.

The double activated phosphor may also be produced by first preparing a calcium silicate phosphor activated with manganese alone, and then combining this with lead as a supplemental activator. For this purpose, manganese-activated calcium silicate may be prepared essentially according to the formulae and method already set forth, merely omitting the lead oxide. After cooling and sieving, the singly-activated phosphor may be mixed with the required amount of lead oxide according to the formulae, and then again heated at about 1000 to 1250° C. for about an hour in an atmosphere of steam.

The manganese-activated magnesium silicate phosphor may be prepared as described in Patent 2,141,905 to G. R. Fonda et al. except that the firing takes place in an atmosphere of steam. Thus, a mixture of magnesium oxide and silica in approximately equi-molecular proportions, together with a suitable manganese compound, preferably sufficient in amount to furnish about .4 to 1.5 per cent by weight of MnO, may be fired at a temperature of about 1250° C. for about an hour or longer in an atmosphere of steam. The phosphor may also be made in proportions approximating the ortho-silicate ($2MgO:1SiO_2$) when fired in steam. The steam fired phosphor has a brightness several fold that of an otherwise similarly prepared air fired phosphor.

A cerium-activated aluminum silicate phosphor disclosed in Patent 2,254,956 to G. Aschermann may have its brightness doubled by firing in mixtures of steam with nitrogen or hydrogen, as against dry nitrogen or hydrogen. Thus, a suitable batch may consist of 102 parts $Al_2O_3$, 180 parts $SiO_2$ and 28 parts $Ce_2O_3$ which corresponds to about $1Al_2O_3:3SiO_2$ with about 10 per cent $Ce_2O_3$. The phosphor may be prepared by dispersing $SiO_2$ in a very concentrated solution of aluminum and cerium nitrates; drying; driving off nitrous gases at about 250° C.; ball milling in methyl alcohol; filtering and drying again; sieving; and firing at 1040° C. In small batches of a few grams, a firing time of 15 minutes gives good results. The brightness of a batch fired in steam and nitrogen was 27 (in arbitrary units) compared to a brightness of 12 when fired in dry nitrogen, and a brightness of 30 was obtained with a batch fired in steam and hydrogen compared with a brightness of 16 when fired in dry hydrogen.

The titanium-activated (with or without manganese as supplemental activator) silicates of calcium, strontium, barium, magnesium, zinc, beryllium or cadmium may be prepared as disclosed in my application Serial No. 499,642 hereinbefore referred to, and to which reference may be had for complete details. Thus, a batch consisting of 90 g. calcium carbonate ($CaCO_3$), 13.6 g. calcium sulphate ($CaSO_4$), 70.7 to 77.6 g. silicic acid (85% $SiO_2$) and 0.6 to 1.2 g. titanium dioxide may be compounded and fired at a temperature of about 1000–1200° C. for about two hours in an atmosphere of steam. The brightness of the phosphor is increased a third by firing in steam compared to air firing.

The yellow-fluorescing zinc silicate may be prepared as disclosed in my application Serial No. 498,405 hereinbefore referred to. By firing in steam, a brighter phosphor may be prepared without resort to high temperatures, fusion, or quenching, or to fluxes. Use can also be made of much larger mol proportions of zinc oxide to silica, exceeding 1:1 and as high as about 1.5:1. A preferred way of preparing the phosphor is to heat a mixture of preformed manganese silicate such as $MnSiO_3$ or $Mn_2SiO_4$ with zinc oxide and silica in an atmosphere of steam at a temperature of about 800–850° C. The manganese silicate can be prepared by heating a thorough mixture of 1 mol MnO or $MnCO_3$ with 1 mol $SiO_2$ or more (a slight excess of $SiO_2$ being preferable) at a temperature of the order of 800° C. in an atmosphere of steam and hydrogen. Air is excluded and the heating is continued until the product is white, which may require about a half hour, depending on the size of the batch. The product is allowed to cool in the hydrogen or other reducing atmosphere.

A suitable batch may then be made up of 30.5 g. zinc oxide (ZnO), 15 g. silica ($SiO_2$) and 2.7 g. manganese silicate ($MnSiO_3$). The mixture is heated at a temperature of the order of 800 to 850° C., more or less. The heating is carried out in a brisk current of steam, or in a mixture of steam with neutral or reducing gas such as pure nitrogen, carbon dioxide or hydrogen, with the exclusion of air, and may require two or three hours for a total batch of some 50 grams as in the above formula. If the phosphor is formed in steam and hydrogen, very little hydrogen should be used in order to avoid partial reduction of zinc oxide in the batch. The MnO content of the phosphor is preferably held between 1 and 5 per cent, preferably about 3 per cent. The uniformity and brightness of phosphor thus produced can be improved somewhat by precalcining a mixture of ZnO and $SiO_2$ for two or three hours at about 750° C. to form amorphous zinc silicate, and afterward mixing this product with manganese silicate (prepared as above described) and firing as described to form the phosphor.

Fairly good results can also be obtained in a one-step firing process that combines the production of $MnSiO_3$ or the maintenance of MnO or other vehicle of bivalent manganese with the production of the matrix and the solution of $MnSiO_3$ or MnO or the like in this matrix. A suitable batch consisting of 30.5 g. zinc oxide (ZnO), 15.8 g. silica ($SiO_2$), 1.9 g. manganese oxide (MnO) and .5 g. boric acid may be heated for three to six hours in an atmosphere of steam and hydrogen or carbon monoxide at a temperature of the order of 800° C.

In the various examples given above the firing atmosphere consists at least preponderantly of steam, and where hydrogen is admixed with the steam in the firing of phosphors such as calcium or magnesium silicate activated with manganese, the hydrogen is preferably employed in a proportion of about 20 to 40 per cent by volume with 80 to 60 per cent steam. However, as pointed out above, in the case of the yellow zinc silicate, the hydrogen is held to a quite small amount, preferably five per cent or less. As to the amount of steam, I have obtained good results in preparing batches of the size mentioned above with a generator furnishing about 5 to 6 liters of steam per minute at 100° C. This amounts to about 20 to 24 liters per minute at the furnace temperature of about 1200° C. In a silica or alundum tube furnace of 10 sq. cm. cross-section this means about 2.4 liters of steam per sq. cm. per minute, or a flow of about 40 cc. per sq. cm. per second through the tube.

What I claim as new and desire to secure by Letters Patent of the United States is:

1. The method of preparing fluorescent calcium silicate activated by both manganese and lead which comprises mixing together compounds of calcium, silicon, lead and manganese selected from the group consisting of the oxides of those metals and compounds which upon heating break down to yield those oxides, the calcium and silicon compounds being present in proportions to form calcium silicate and the lead and manganese compounds being present in activating proportions, and heating the mixture at a temperature of about 1000 to 1250° C. in an atmosphere consisting at least preponderantly of steam.

2. The method of preparing fluorescent calcium silicate activated by both manganese and lead which comprises firing at a temperature of about 1000 to 1250° C. in an atmosphere consisting at least preponderantly of steam a batch consisting of calcium carbonate and silicic acid in proportions furnishing one mol of CaO to about 1.1 to 1.2 mols $SiO_2$, lead oxide in an amount of about 2 to 5 per cent by weight of the batch, and manganese carbonate in an amount to furnish about 2 to 4 per cent by weight of MnO.

3. The method of preparing fluorescent calcium silicate activated by both manganese and lead which comprises firing at a temperature of about 1000 to 1250° C. in an atmosphere consisting of steam a batch consisting of the following ingredients in approximately the proportions stated:

| | Parts by weight |
|---|---|
| Calcium carbonate | 50 |
| Silicic acid | 38.8 |
| Lead oxide | 1.6–5 |
| Manganese carbonate | 2.4–3.6 |

4. The method of preparing a fluorescent silicate activated by metal of the group consisting of manganese, lead, cerium and mixtures of manganese and lead which comprises firing at a temperature within the range of about 700–1300° C. in an atmosphere consisting at least preponderantly of steam a mixture of compounds of silicon and a metal in proportions to form silicate of the said metal and an activating proportion of compound of the activating metal, the several said compounds being selected from the group consisting of the respective oxides and compounds which upon heating break down to yield those oxides.

5. The method of preparing a fluorescent silicate activated by metal of the group consisting of manganese, lead, cerium and mixtures of manganese and lead which comprises firing at a temperature within the range of about 700–1300° C. in an atmosphere consisting of steam a mixture of compounds of silicon and a metal in proportions to form silicate of the said metal and an activating proportion of compound of the activating metal, the several said compounds being selected from the group consisting of the respective oxides and compounds which upon heating break down to yield those oxides.

6. The method of preparing a fluorescent silicate activated by metal of the group consisting of manganese, lead, cerium and mixtures of manganese and lead which comprises firing at a temperature within the range of about 700–1300° C. in an atmosphere consisting of steam admixed with a non-oxidizing gas in proportions of at least about 60 per cent by volume of steam a mixture of compounds of silicon and a metal in proportions to form silicate of the said metal and an activating proportion of compound of the activating metal, the several said compounds being selected from the group consisting of the respective oxides and compounds which upon heating break down to yield those oxides.

7. The method of preparing a fluorescent silicate activated by manganese which comprises firing at a temperature within the range of about 700–1300° C. in an atmosphere consisting at least preponderantly of steam a mixture of compounds of silicon and a metal in proportions to form silicate of the said metal and an activating proportion of manganese compound, the several said compounds being selected from the group consisting of the respective oxides and compounds which upon heating break down to yield those oxides.

8. The method of preparing a fluorescent silicate activated by cerium which comprises firing at a temperature within the range of about 700–1300° C. in an atmosphere consisting at least preponderantly of steam a mixture of compounds of silicon and a metal in proportions to form silicate of the said metal and an activating proportion of cerium compound, the several said compounds being selected from the group consisting of the respective oxides and compounds which upon heating break down to yield those oxides.

HERMAN C. FROELICH.

REFERENCES CITED

The following references are of record in the file of this patent:

UNITED STATES PATENTS

| Number | Name | Date |
|---|---|---|
| 2,306,567 | Roberts | Dec. 29, 1942 |
| 2,415,129 | Froelich | Feb. 4, 1947 |
| 2,421,207 | Leverenz | May 27, 1947 |

Certificate of Correction

Patent No. 2,525,028 October 10, 1950

HERMAN C. FROELICH

It is hereby certified that error appears in the printed specification of the above numbered patent requiring correction as follows:

Column 3, line 46, for "$(SiO_2.xH_2)$" read $(SiO_2.xH_2O)$; column 6, lines 25, 39, 52 and 67, and column 7, line 4, before the word "activated" insert *of metal of the group consisting of zinc, magnesium, calcium, and aluminum*; column 6, lines 31, 44 and 59, after "metal" insert *of the first-mentioned group*; same column 6, line 71, and column 7, line 8, after "metal" insert *of the said group*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*